(12) United States Patent
Zeng

(10) Patent No.: US 6,461,754 B1
(45) Date of Patent: Oct. 8, 2002

(54) SOLID POLYMER ELECTROLYTE FUEL CELL HAVING A COOLANT CIRCULATION CIRCUIT

(75) Inventor: Yixin Zeng, Kariya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 38 days.

(21) Appl. No.: 09/629,885

(22) Filed: Jul. 31, 2000

(30) Foreign Application Priority Data

Jul. 29, 1999 (JP) .......................................... 11-216019

(51) Int. Cl.[7] .............................................. H01M 8/04
(52) U.S. Cl. .......................................... 429/26; 429/34
(58) Field of Search .......................... 429/13, 26, 34–39

(56) References Cited

U.S. PATENT DOCUMENTS

| | | |
|---|---|---|
| 4,988,583 A | 1/1991 | Watkins et al. |
| 5,858,569 A * | 1/1999 | Meacher et al. |
| 6,274,262 B1 * | 8/2001 | Canfield |

* cited by examiner

Primary Examiner—Patrick Ryan
Assistant Examiner—Susy Tsang-Foster
(74) Attorney, Agent, or Firm—Oblon, Spivak, McClelland, Maier & Neustadt, P.C.

(57) ABSTRACT

A solid polymer electrolyte fuel cell having a coolant circulation circuit is made up of a coolant flow field plate having a surface opposed to a cell surface, an open faced coolant flow channel formed in a major region of the surface of the coolant flow field plate, the open-faced coolant flow channel being divided into a plurality of divisional passages in regional fashion, a coolant inlet port at one end of each of the divisional passages, and a coolant outlet port at the other end of each of the divisional passages. Thus, the major region is divided into the corresponding plurality of divisional regions which can be differentiated in temperature gradient, with the result that the coolant temperature gradient may be made non-linear, excessive local wetting and/or drying at electrodes can be restricted, and the inner resistance of the cell and the current density at the cell surface can be made uniform.

7 Claims, 12 Drawing Sheets

SOLID POLYMER ELECTROLYTE FUEL CELL HAVING A COOLANT CIRCULATION CIRCUIT

BACKGROUND OF THE INVENTION

1. Field of the Invention

The present invention is directed to a solid polymer electrolyte fuel cell having a coolant circulation circuit.

2. Discussion of the Background Art

A conventional solid polymer electrolyte fuel cell of this kind, disclosed in U.S. Pat. No. 4,988,583, for maintaining the temperature of the cell at a desired or predetermined value, is illustrated in FIG. 12. As is there illustrated, the major surface of each of the plates PT is provided with a single continuous open-faced fluid flow channel P which traverses the central area of the plate surface in a serpentine manner. Coolant flows into an inlet port I, through the fluid flow channel P, and out from an outlet port O. The f low direction of the coolant is along the flow directions of fuel and air. Such a design structure is conventional in most solid polymer electrolyte fuel cells.

In the foregoing structure, gradients arise in the fuel (air) flow direction, for the gas composition, pressure, temperature, and humidity. However, the temperature gradient of coolant at the cell surface, which results mainly from heat exchange between the coolant and the reaction waste heat, is not undesired or unsuitable for the local pressure, temperature, and humidity required by both the fuel electrode and air electrode. But the coolant temperature gradient at the cell surface is linear, whereas it should be nonlinear in order for the current density distribution of the cell to be uniform. Thus, along the cell surface, the gas conditions at the fuel and air electrodes becomes uneven.

The aforementioned uneven gas conditions of the fuel and air results in the in-cell resistance varying widely, and so the current density on the cell surface varies widely. Such variation of the current density causes a scattering of the in-cell reaction heat distribution, which makes it difficult to establish heat management and water management, whereby the thermal hysteresis difference between catalysts and the thermal hysteresis difference between ion exchange membranes become large. Thus, the life of each of the catalysts and each of the ion exchange membranes is reduced.

In view of the foregoing circumstances, there is a need for an optimal fluid flow channel which is free from the foregoing drawbacks.

SUMMARY OF THE INVENTION

It is, therefore, a primary object of the present invention to provide a solid polymer electrolyte fuel cell which meets such a need.

In order to attain the foregoing and other objects, according to a first aspect thereof the present invention provides a solid polymer electrolyte fuel cell having a coolant circulation circuit, the solid polymer electrolyte fuel cell comprising a cell part having a cell surface; a coolant flow field plate having a surface positioned opposed to the cell surface; an open-faced coolant flow channel formed in a region of the surface of the coolant flow field plate, the open-faced coolant flow channel being divided into a plurality of divisional passages; a coolant inlet provided port at one end of each of the divisional passages; and a coolant outlet port provided at the other end of each of the divisional passages.

In accordance with the first aspect of the present invention, the regions defined by the respective divisional passages can differ in temperature gradient.

According to a second aspect of the present invention, the coolant outlet port of an upstream one of the divisional passages is adjacent the coolant inlet port of a downstream one of the divisional passages in a direction of coolant flow.

In accordance with the second aspect of the present invention, the introduction of the coolant f an upstream side divisional passage into a downstream side divisional passage becomes easier.

A third aspect of the present invention is to provide a solid polymer electrolyte fuel cell wherein the divisional passages are connected in series.

In accordance with the third aspect of the present invention, it becomes possible to establish a temperature pattern wherein the different temperature gradients continue.

In accordance with a fourth aspect of the present invention, a heat exchanger is interposed in a flow path of the coolant between the coolant outlet port of the upstream one of said divisional passages and the coolant inlet port of the downstream one of said divisional passages.

In accordance with the fourth aspect of the present invention, the heat exchanged or temperature controlled coolant is introduced into the downstream side divisional passage, which makes it possible to adjust the temperature gradients at the cell surface in an arbitrary fashion.

A fifth aspect of the present invention is to provide a solid polymer electrolyte fuel cell according to the third aspect, wherein a flow rate regulator is interposed in a flow path of the coolant between the coolant outlet port of the upstream one of said divisional passages and the coolant inlet port of the downstream one of said divisional passages.

In accordance with the fifth aspect of the present invention, the heat exchanged or temperature controlled and amount-adjusted coolant is introduced into the downstream side divisional passage, which makes it possible to establish non-linear temperature gradients at the cell surface in an arbitrary fashion.

In accordance with a sixth aspect of the present invention, a flow rate regulator and a heat exchanger are interposed in a flow path of the coolant between the coolant outlet port of the upstream one of said divisional passages and the coolant inlet port of the downstream one of said divisional passages, wherein the heat exchanger is disposed between the flow rate regulator and the coolant inlet port of the downstream one of said divisional passages.

In accordance with the sixth aspect of the present invention, the amount-adjusted coolant is introduced into the downstream side divisional passage, which makes it possible to adjust the non-linear temperature gradients at the cell surface in an arbitrary fashion. In addition, excess local drying or wetting at each of the fuel and air electrodes can be restricted, which makes it possible to establish a uniform in-cell resistance and an even distribution of the current density at the cell surface.

In accordance with a seventh aspect of the present invention, a flow rate regulator and a heat exchanger are interposed in a flow path of the coolant between the coolant outlet port of the upstream one of said divisional passages and the coolant inlet port of the downstream one of said divisional passages, wherein the heat exchanger and the flow rate regulator are arranged in parallel.

In accordance with the seventh aspect of the present invention, the heat-exchanged amount-adjusted coolant is introduced into the downstream side divisional passage, which makes it possible to adjust the nonlinear temperature gradients at the cell surface in an arbitrary fashion. In addition, excess local drying or wetting at each of the fuel and air electrodes can be restricted, which makes it to establish a uniform in-cell resistance and an even distribution of the current density at the cell surface.

BRIEF DESCRIPTION OF THE DRAWINGS

These and other features and advantages of the present invention will be more readily apprehended from the following detailed description when read in connection with the appended drawing, which form a part of this original disclosure, and wherein.

DETAILED DESCRIPTION OF THE INVENTION

[First Embodiment]

Figure 1:
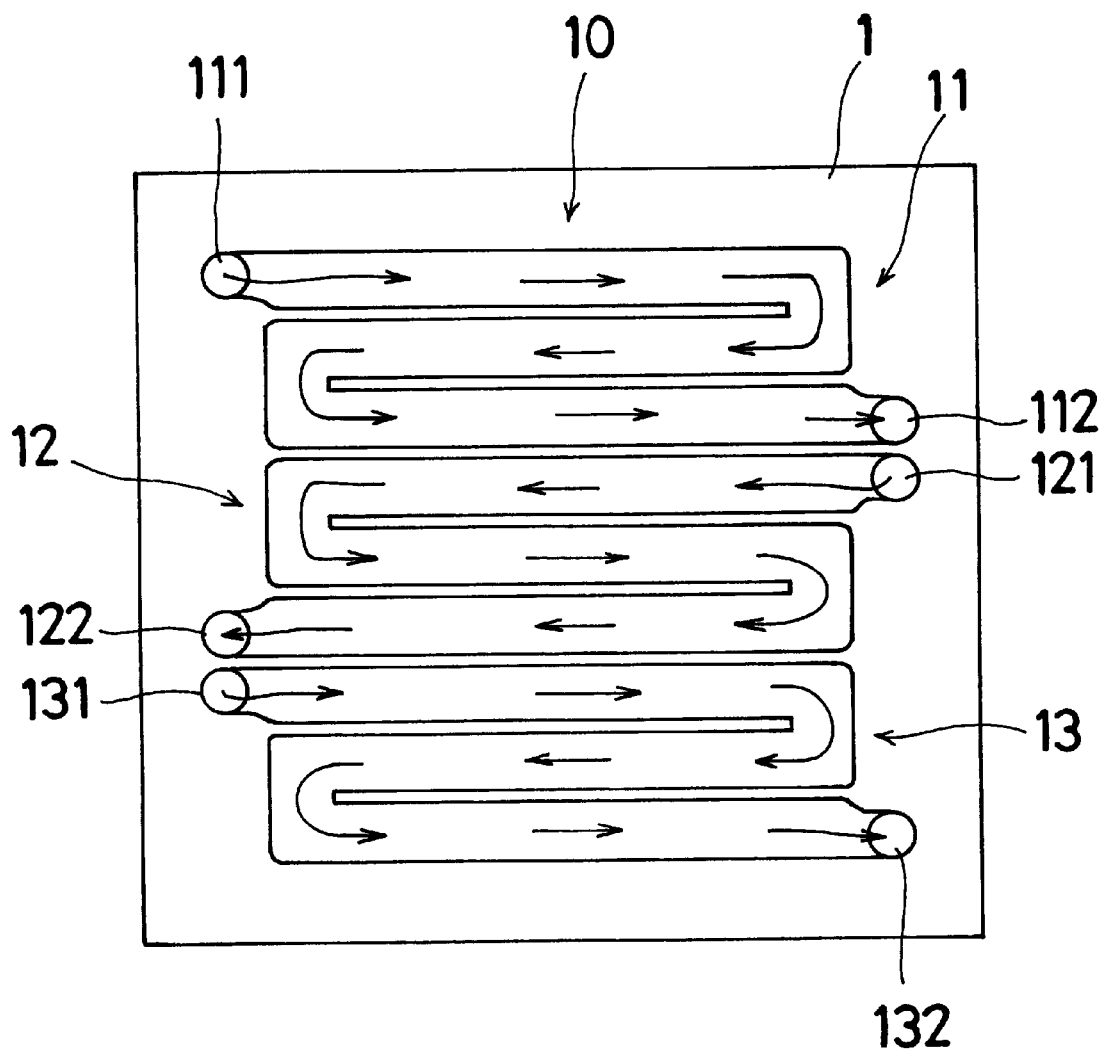
FIG. 1 illustrates a front view of a coolant flow field plate.
Figure 2:
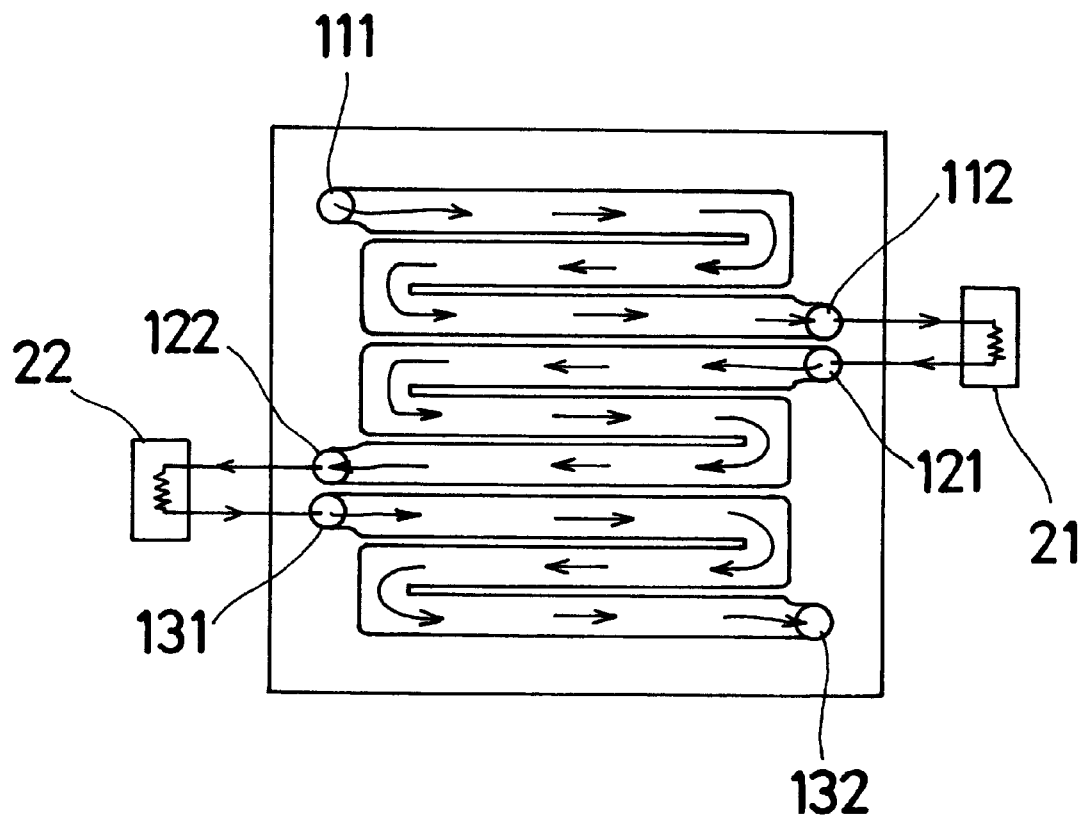
FIG. 2 illustrates a view which explains a relationship between heat exchangers and the coolant flow field plate shown in FIG. 1.
Figure 3:
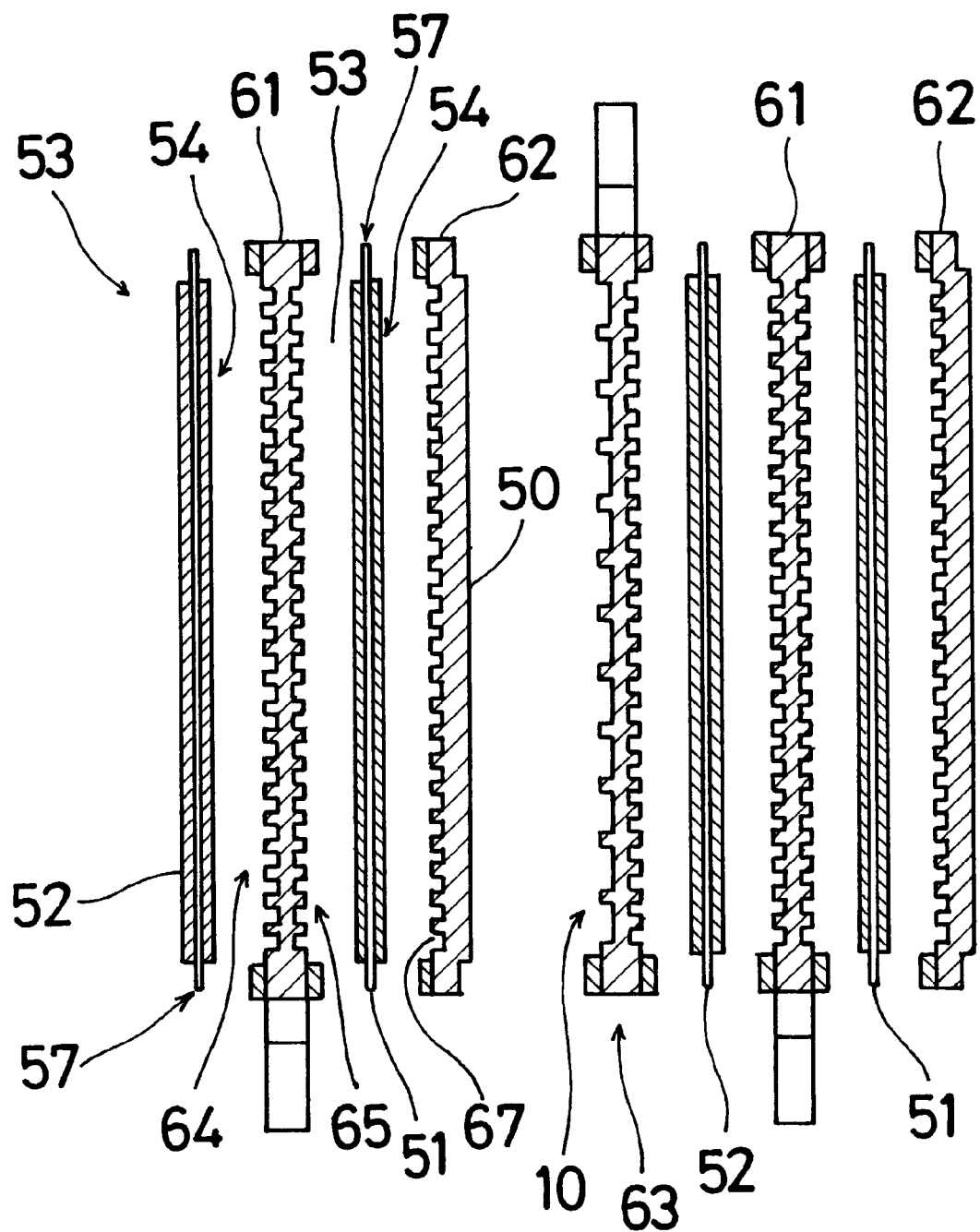
FIG. 3 is an exploded side view of an interior of a solid polymer electrolyte fuel cell.

First, with reference to FIGS. 1 to 4 inclusive, there is illustrated a solid-state polymer electrolyte type fuel cell having a coolant circulation circuit. The fuel cell includes a coolant flow field plate or separator 1 which has a flat surface in opposition to a cell surface 50 (FIG. 3). An open-faced coolant flow channel 10 which constitutes a major part of the coolant circulation circuit is formed in a major region of the flat surface of the coolant flow field plate 1. The open face coolant flow channel 10 is divided into three divisional passages: a first divisional passage 11, a second divisional passage 12 and a third divisional passage 13. Each of the divisional passages 11, 12 and 13 traverses an area of the flat surface of the coolant flow field plate 1 in a serpentine fashion, and therefore each of the divisional passages 11, 12 and 13 covers a region of the coolant flow field plate 1. Coolant inlet ports 111, 121 and 131 are provided at one of the ends of the divisional passages 11, 12 and 13, respectively, while coolant outlet ports 112, 122 and 132 are provided at the other of the ends of the divisional passages 11, 12 and 13, respectively.

The solid-state polymer electrolyte type fuel cell includes electrode units 51 and 52. The electrode unit 51 is made by sandwiching a high polymer ion exchanging membrane 57 as an electrolyte between hydrogen electrodes 53 and 54.

The electrode unit 52 is made similarly. Between the electrode units 51 and 52, a separator 61 is interposed or sandwiched, while the electrode unit 51 is also interposed or sandwiched between the separator 61 and a separator 62. A left surface of the separator 61 which is in contact with a right surf ace of the electrode unit 52 is formed with an air flow passage 64, while a right surface which is in contact with a left surface of the electrode unit 51 is formed with a hydrogen flow passage 65. A left surface of the separator 62 which is in contact with a right surface of the electrode unit 51 is formed with an air flow passage 67. The left surface of the separator 1 which is formed with the coolant flow passage 10 is brought into contact with a right surface of the separator 62, which constitutes the cell surface 50. A stack of such elements 52, 61, 51, 62 and 63 constitutes the cell.

The coolant inlet port 121 at one end of the second divisional passage 12 is located near the coolant outlet port 112 at the other end of the first divisional passage 11 in a mutually close fashion. Similarly, the coolant inlet port 131 at one end of the third divisional passage 13 is located near the coolant outlet port 122 at the other end of the second divisional passage 12 in a mutually close fashion. The coolant inlet port 121 and the coolant outlet port 112 which are located close to each other are in fluid communication with each other. Likewise, the coolant inlet port 131 and the coolant outlet port 122 which are located close to each other are in fluid communication with each other. Thus, the first divisional passage 11, the second divisional passage 12 and the third divisional passage 13 are in a series connection.

As best shown FIG. 2, in detail, an externally positioned heat exchanger 21 for the temperature control of the coolant is interposed or provided between the mutually closely arranged coolant outlet port 112 and the coolant inlet port 121. Similarly, an externally positioned heat exchanger 22 for the temperature control of the coolant is interposed or provided between the mutually closely arranged coolant outlet port 122 and the coolant inlet port 131.

Figure 4:
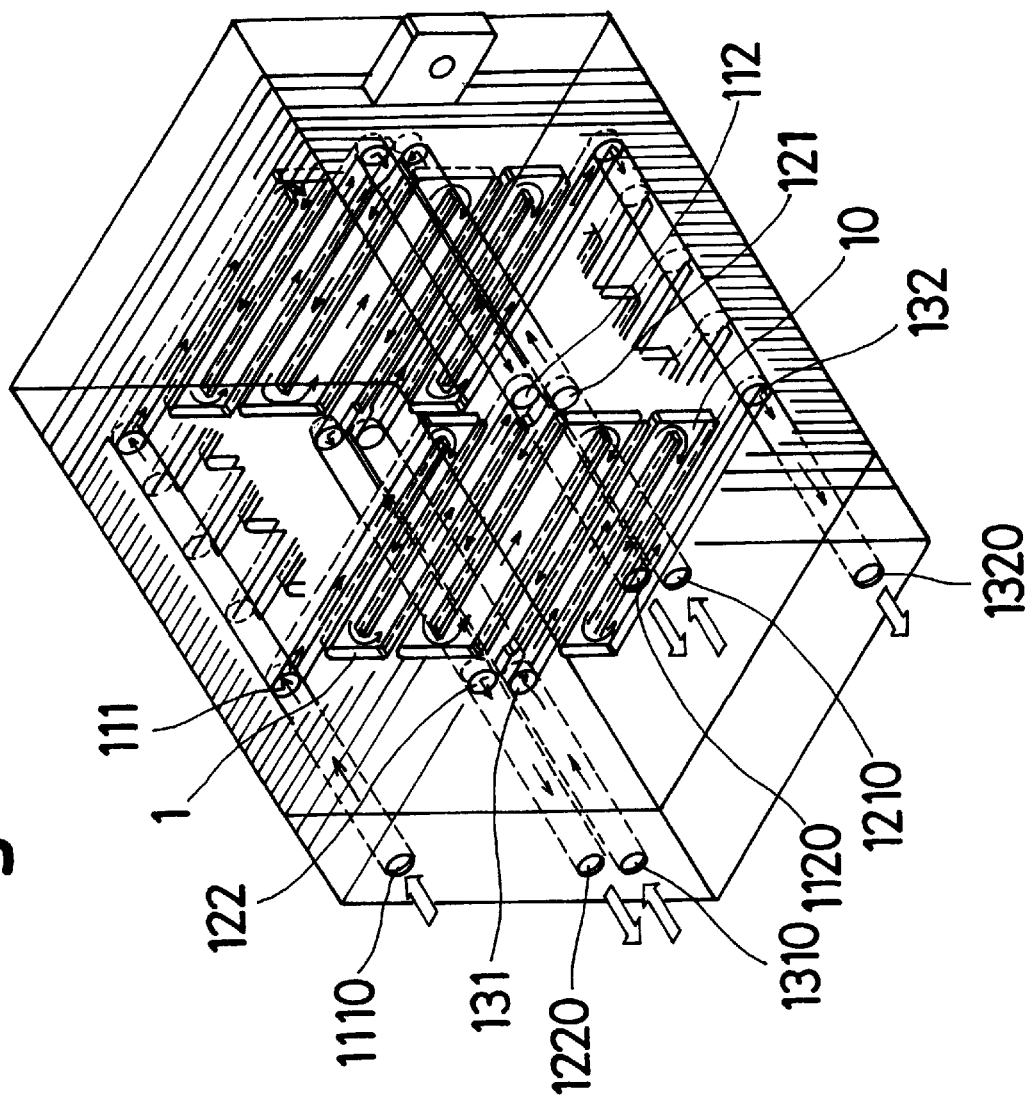
FIG. 4 is a perspective view of the solid polymer electrolyte fuel cell which is in stacked condition.

In the present embodiment, as illustrated in FIG. 4, in the solid-state polymer electrolyte type fuel cell which is formed by stacking the aforementioned units, a plurality of coaxially aligned coolant inlet ports 111 are connected with each other by way of a common distribution manifold 1110. Similarly, common distribution manifolds 1120, 1210, 1220, 1310, and 1320 establish mutual connections of the plural coolant inlet ports 121, the plural coolant inlet ports 131, the plural coolant outlet ports 112, the plural coolant outlet ports 122, and the plural coolant outlet ports 132.

In the solid-state polymer electrolyte type fuel cell having the forgoing structure the coolant is introduced into the first divisional passage 11 by way of the coolant inlet port 111, the coolant then flows or passes through the first divisional passage 11 and goes outside the fuel cell by way of the coolant outlet port 112. The coolant is then introduced into the heat exchanger 21 which is placed outside the fuel cell so as to be cooled down or warmed up, and is then introduced into the coolant inlet port 121 of the second divisional passage 12.

The coolant introduced into the second divisional passage 12 goes or flows therethrough and goes outside the fuel cell from the coolant outlet port 122. The coolant is then introduced into the heat exchanger 22 which is placed outside the fuel cell so as to be cooled down or warmed up, and is then introduced into the coolant inlet port 131 of the third divisional passage 13.

The coolant introduced into the third divisional passage 13 goes or flows therethrough and goes outside the fuel cell from the coolant outlet port 132.

Figure 5A:
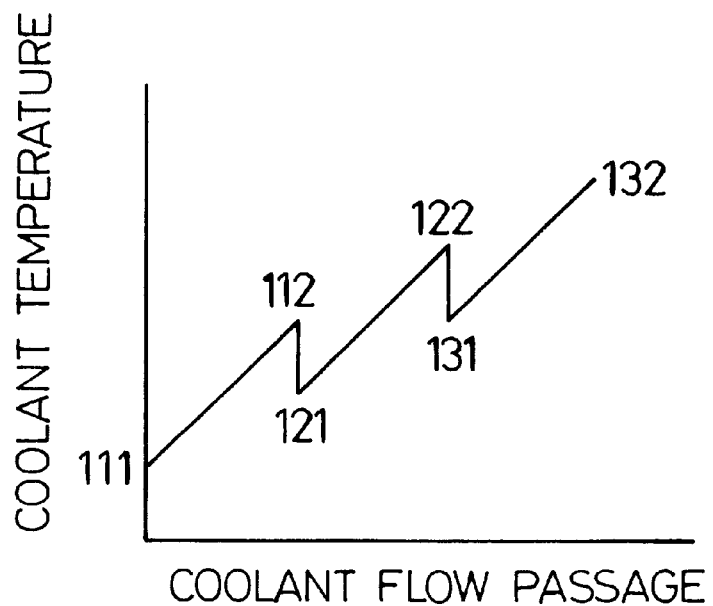
FIGS. 5(A) and 5(B) illustrate different temperature gradients when the coolant flow field plate shown in FIG. 1 is employed.
Figure 5B:
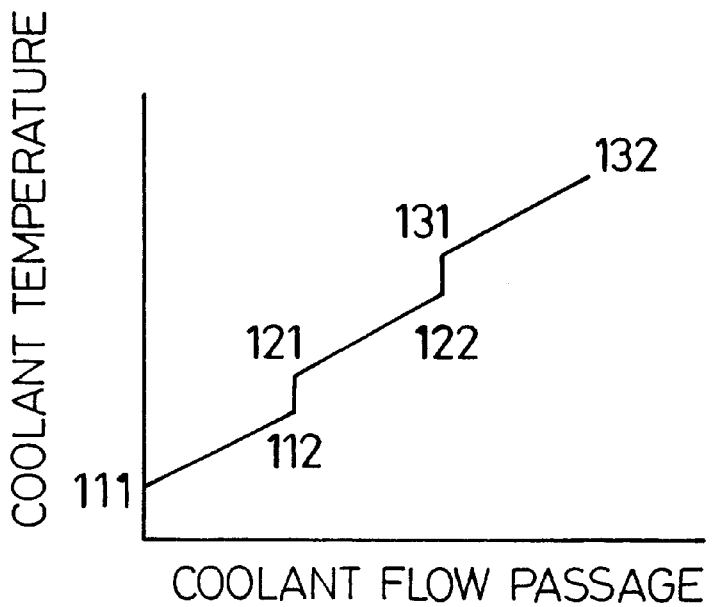

FIG. 5(A) illustrates a profile or diagram which represents the thermal characteristics of the present embodiment when the coolant is cooled down at the heat exchangers 21 and 22, while FIG. 5(B) illustrates a profile or diagram which represents the thermal characteristics of the present embodiment when the coolant is warmed up at the heat exchangers 21 and 22.

In the solid polymer electrolyte cell having the aforementioned structure and making the aforementioned operation, the open-face coolant flow channel 10 is regionally divided into three divisional passages 11, 12 and 13, the coolant is introduced into the coolant inlet port 111 of the first passage 11 and is discharged from the coolant outlet port 112 thereof, the coolant is then introduced into the coolant inlet port 121 of the second passage 12 and is discharged from the coolant outlet portion 122 thereof, and then the coolant is introduced into the coolant inlet port 131 of the third passage 13 and is discharged from the outlet port 132 thereof. Thus, the regions of the flat surface of the separator 1 which are related to the first divisional passage 11, the second divisional passage 12 and the third divisional passage 13, respectively, can be differentiated in temperature gradient.

In addition, in the foregoing solid polymer electrolyte cell, the first divisional passage 11, the second divisional passage 12 and the third divisional passage 13 are connected in series by connecting the coolant outlet port 112 and the coolant inlet port 121, and by connecting the coolant outlet port 122 and the coolant inlet port 131 via heat exchangers 21 and 22, and so the coolant is thermally controlled as it is fed downstream. As a result, the temperature gradient of the coolant on the cell surface 50 can assume a non-linear pattern such as the serration shape and stepwise shape shown in FIGS. 5($a$) and 5($b$), respectively.

In addition, in the foregoing solid polymer electrolyte cell, the temperature gradation of the coolant can be made non-linear in an arbitrary fashion, which makes it possible to restrict excess local drying and/or excess local wetting of each of the fuel electrodes and air electrodes, as a result of which the internal resistance of the cell and current density at the cell surface 50 may be evenly distributed.

Furthermore, the coolant outlet port 112 of the first divisional passage 11 is placed close to the coolant inlet port 121 of the second divisional passage 12 and the coolant outlet port 122 of the second divisional passage 12 is placed close to the coolant inlet port 131 of the third divisional passage 13, which makes it possible to establish easy downstream directional transfers of the coolant discharged from the coolant output port 112 of the first divisional passage 11 and the coolant output port 122 of the divisional second passage 12 to the coolant input port 121 of the second divisional passage 12 and the coolant input port 131 of the third divisional passage 13, respectively.

It is noted that although in the foregoing description the open-faced coolant flow channel 10 is divided into three divisional passages as an example for easy understanding, the open-faced coolant flow channel 10 can be divided into 'n' (n: arbitrary integer more than 1) divisional passages. For dividing the open-faced coolant flow channel 10 into an arbitrary number (n) of divisional passages, the number of external heat exchangers is (n−1) and the number of the combination of the coolant outlet portion of a specific divisional passage and the coolant inlet port of the subsequent downstream side divisional passage is (n).

[Second Embodiment]

Figure 6:
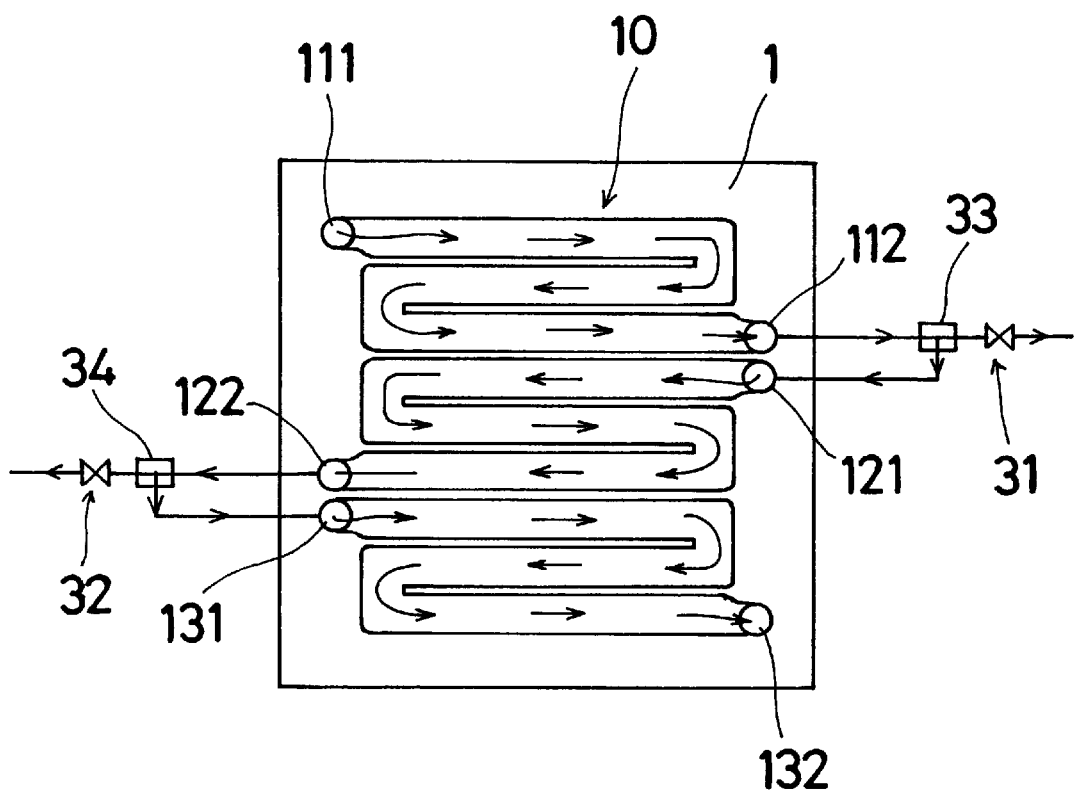
FIG. 6 illustrates a first modification of the coolant flow field plate shown in FIG. 1.

In FIG. 6, there is illustrated a solid polymer electrolyte cell 10 of the second embodiment. The present solid polymer electrolyte cell 10 is identical with the solid polymer electrolyte cell shown in FIG. 1 except that in the second embodiment a coolant outlet port 112 of a first divisional passage 11 (a coolant outlet port 122 of the second divisional passage 12) is connected to a coolant inlet port 121 of the second divisional passage 12 (a coolant inlet port 131 of the third divisional passage 13) by way of a flow divider 33 with a f low rate regulator 31 (a flow divider 34 with a flow rate regulator 32).

As is well known, the flow divider 33 has an inlet port, a first outlet port and a second outlet port. The inlet port is connected to the coolant outlet port 112 and is in continuous fluid communication with both the flow regulator 31 and the second coolant inlet port 121. The amount of coolant which flows to the second coolant inlet port 121 is regulated by the flow rate regulator 31. Similarly, the flow divider 34 has an inlet port, a first outlet port and a second outlet port. The sole inlet port is connected to the coolant outlet port 122 and is in continuous fluid communication with both the flow regulator 32 and the coolant inlet port 131. The amount of the coolant which flows to the coolant inlet port 131 is regulated by the flow rate regulator 32.

Figure 7:
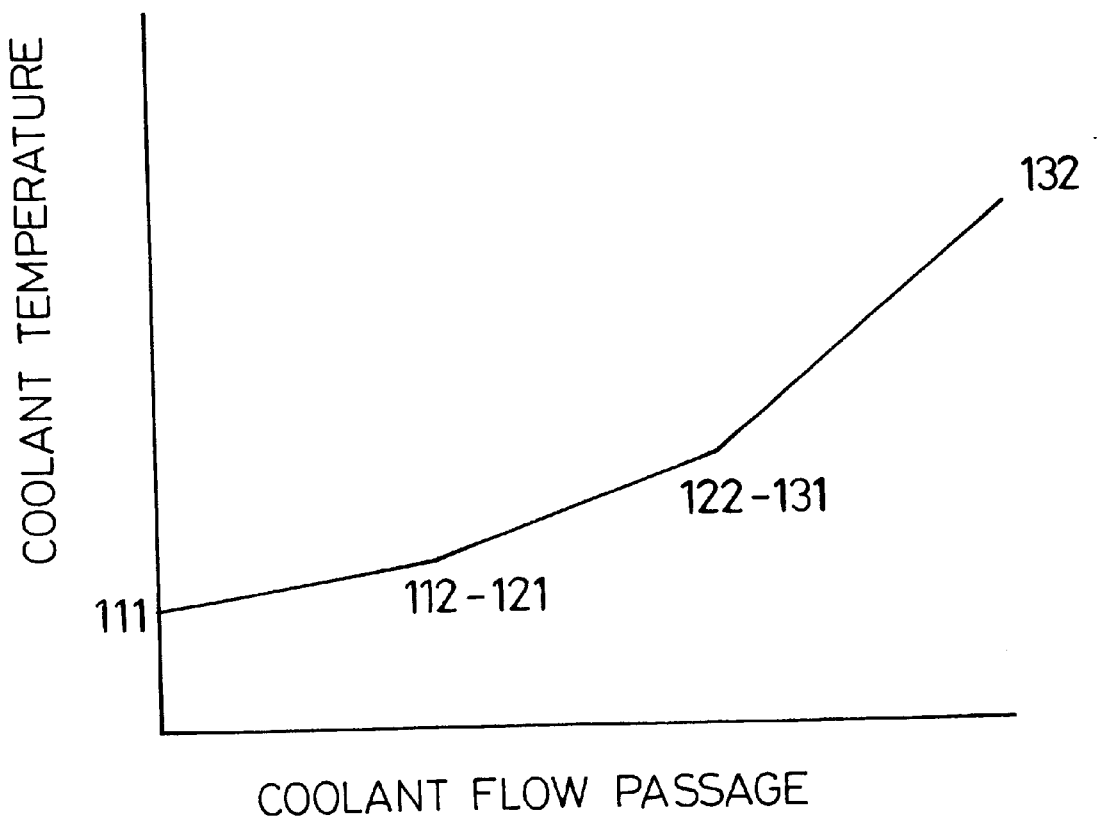
FIG. 7 illustrates a temperature gradient when the coolant flow field plate shown in FIG. 6 is employed.

In the foregoing structure, the flow rate regulators 31 and 32 are controlled so that the amount of coolant which is introduced into the coolant inlet port 131 is smaller than the amount of coolant which is to be introduced into the coolant inlet port 121. Thus, the regions which are related by the respective divisional passages 11, 12 and 13 are differentiated in temperature gradient, which makes it possible to establish a nonlinear pattern of the temperature gradient as illustrated in FIG. 7.

[Third Embodiment]

Figure 8:
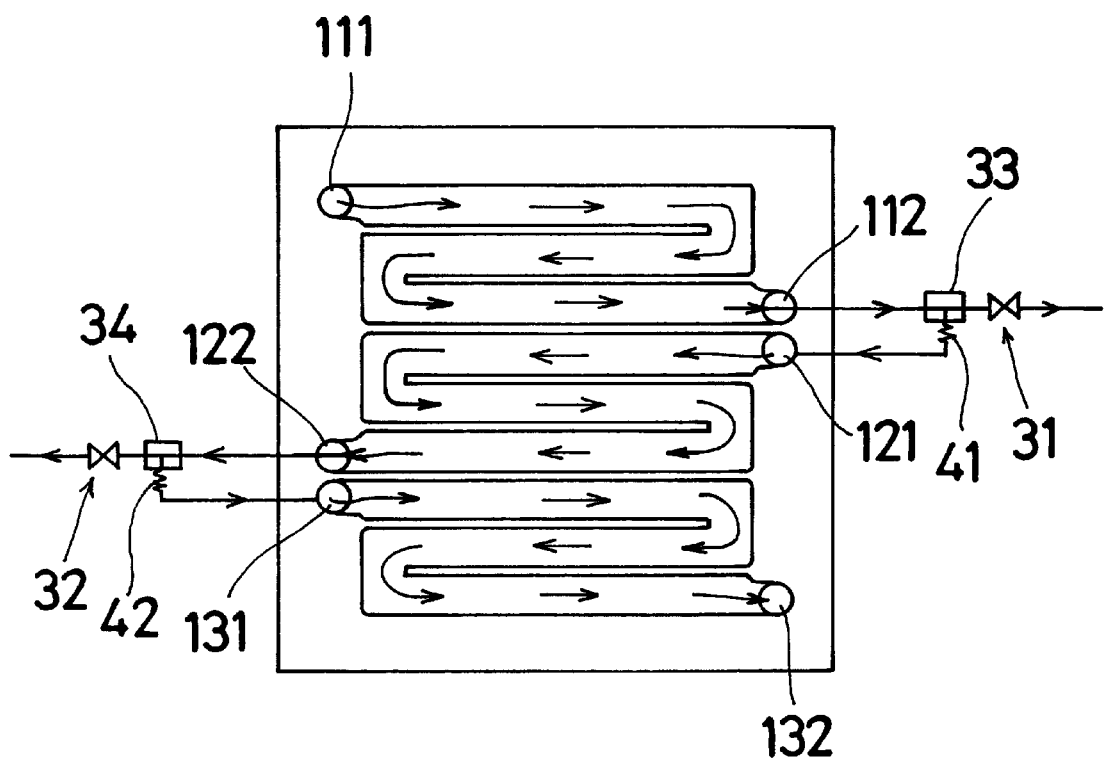
FIG. 8 illustrates a second modification of the coolant flow field plate shown in FIG. 1.

As illustrated in FIG. 8, a solid polymer electrolyte cell 10 of the third embodiment differs from the previous structure in that the present embodiment has a heat exchange 41 (42) interposed, at the outside of the cell, between a f low divider 33 (34) and a coolant inlet port 121 (131) of a second divisional passage 12 (a third divisional passage 13).

Figure 10:
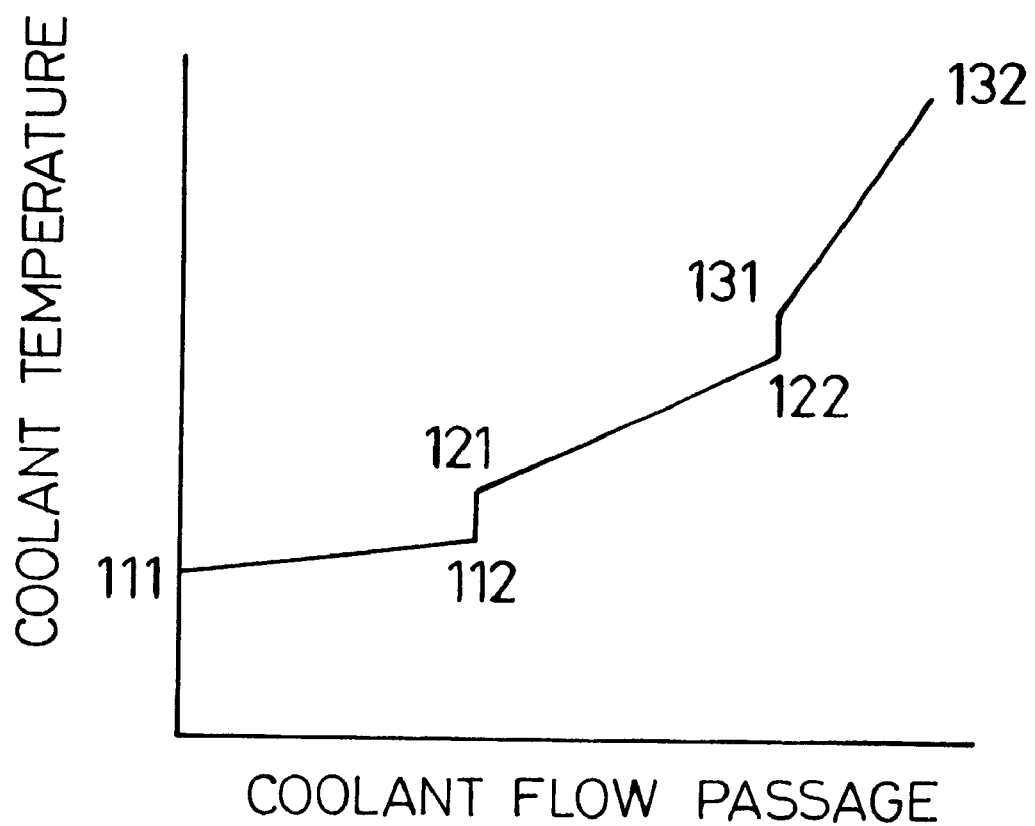
FIG. 10 illustrates a temperature gradient when the coolant flow field plate shown in FIG. 8 is employed.

In the foregoing structure, flow rate regulators 31 and 32 are controlled to establish that the amount of coolant which is introduced into the coolant inlet port 131 is smaller than the amount of coolant which is introduced into the coolant inlet port 121. In addition, the coolant is warmed by the heat exchangers 41 and 42 before entering the coolant inlet ports 121 and 131, respectively. Thus, the regions which are related to the respective divisional passages 11, 12 and 13 are differentiated in temperature gradient, which makes it possible to establish a nonlinear pattern of the temperature gradient and to establish a stepwise temperature rise between two adjacent regions as illustrated in FIG. 10.

In detail, in the solid polymer electrode cell 10 of the third embodiment, a coolant circulation is provided which makes it possible to optimize the coolant temperature gradient by employing the aforementioned structure in such a manner that the temperature gradient of the coolant flowing through each of the passages 11, 12 and 13 in contact with the cell surface 50 is made by, in addition to in-cell heat exchange, employing temperature adjustment means for adjusting the flow amount of the coolant outside of the cell and for heat-exchanging at the outside of the cell, in dependent of pressure, temperature, and humidity of each of the fuel electrodes 53 and 54 and the air electrodes 55 and 56. Thus, it becomes possible to restrict excess local drying and/or wetting at each of the fuel electrodes 53 and 54 and the air electrodes 55 and 56, and therefore the internal resistance of the cell and current density at the cell surface 50 are evenly distributed.

[Fourth Embodiment]

Figure 11:
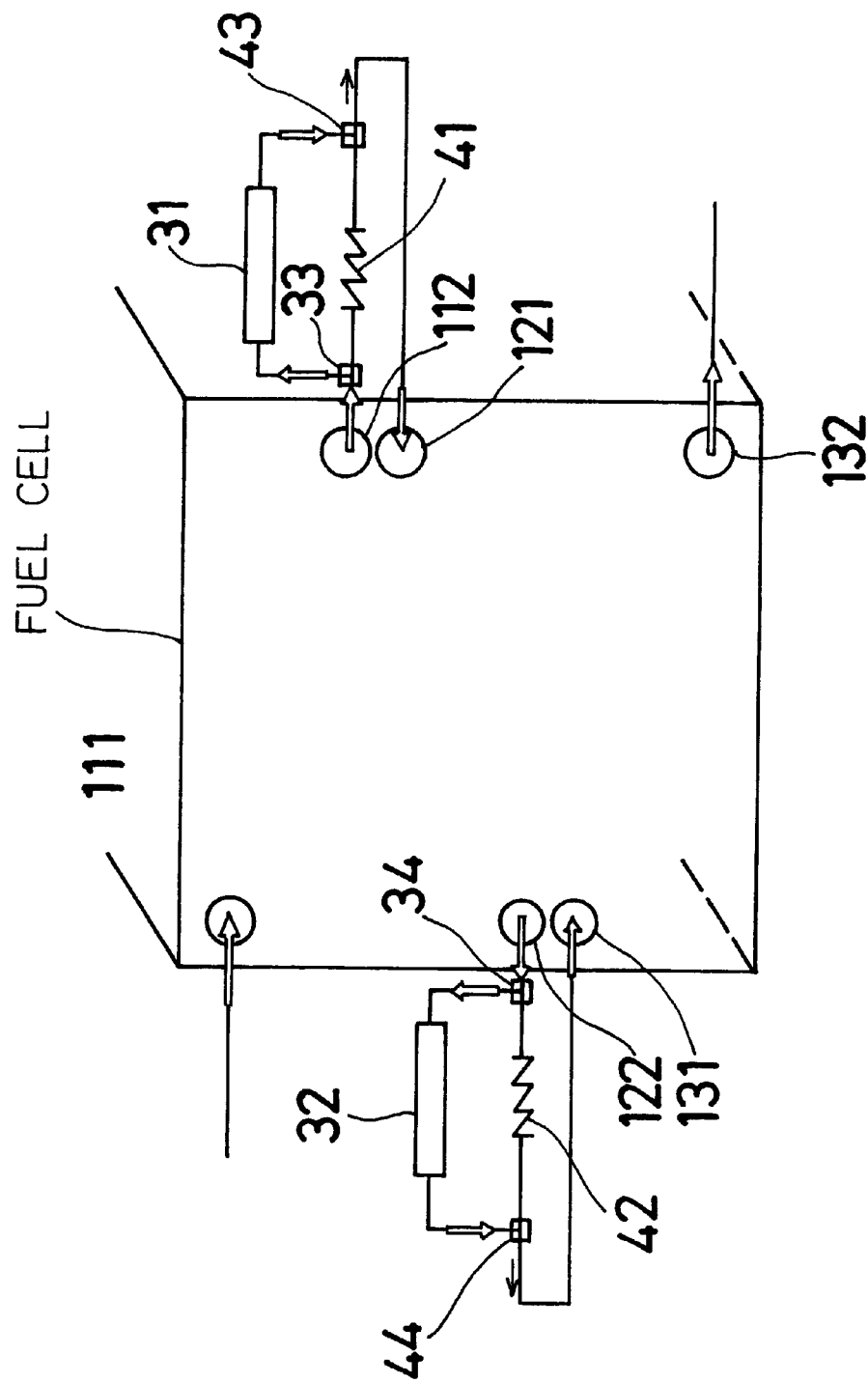
FIG. 11 illustrates a third modification of the coolant flow field plate shown in FIG. 1 when it is associated with an external heat exchanger and flow regulator.
Figure 12:
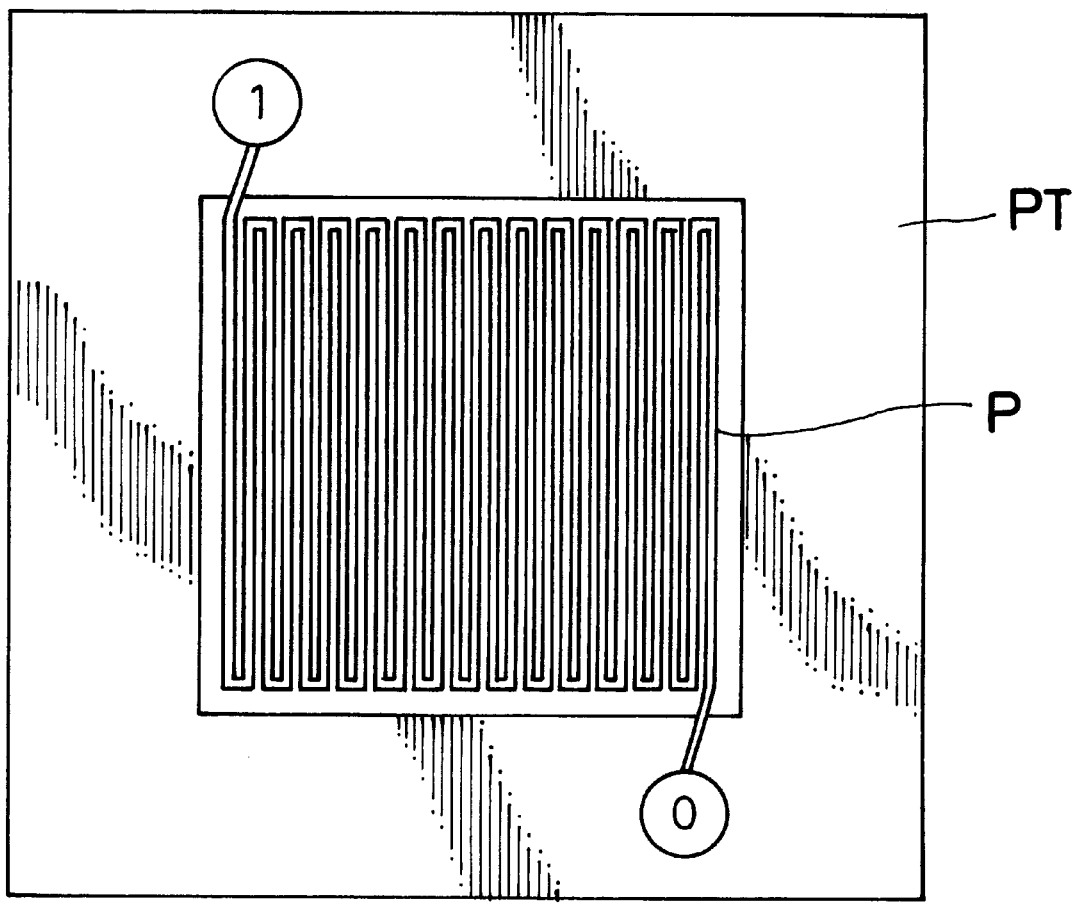
FIG. 12 illustrates a front view of a conventional coolant flow field plate formed therein with a coolant flow channel.

As illustrated in FIG. 11, a solid polymer electrolyte cell 10 of the fourth embodiment differs from the structure illustrated in FIG. 6 in that in this embodiment a flow rate adjuster 31 (32) and a heat exchanger 41 (42) are arranged in parallel. In detail, the coolant discharged from the coolant outlet port 112 (122) separates at the flow divider 33 (34) whose inlet port is connected to the coolant outlet port 112 (122). Part of the coolant flows through the flow rate regulator 31 (32) and enters a flow merger 43 (44), while another part of the coolant flows through the heat exchanger 41 (42). The separated flows which are regulated in flow rate by the flow rate regulator 31 (32) and controlled in temperature, respectively, merge at the flow merger 43 (44) and the resultant coolant enters the coolant inlet port 121 (131) of the downstream side divisional passage 12 (13).

Figure 9:
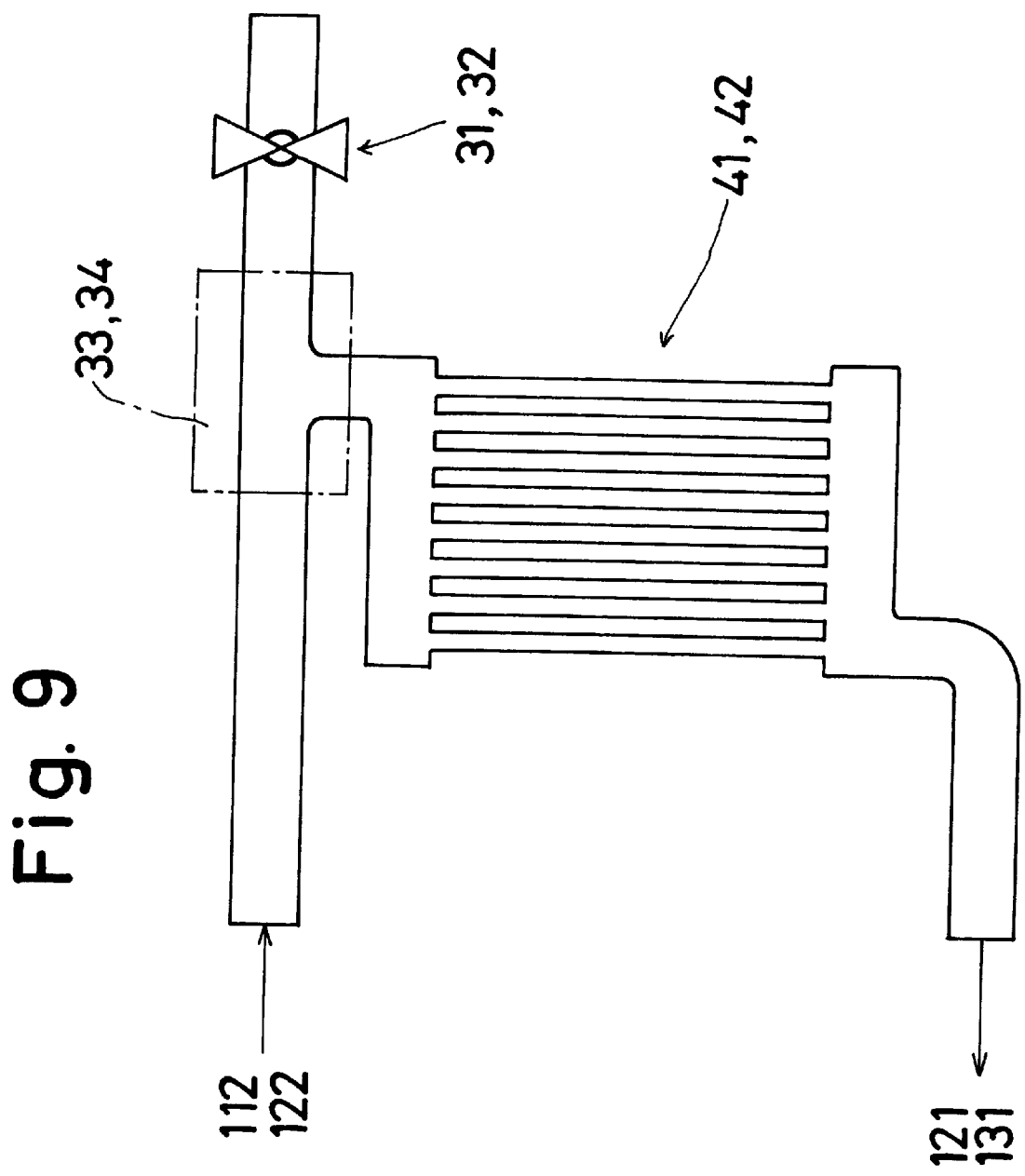
FIG. 9 is a detail of the external heat-exchanger and flow adjuster shown in FIG. 8.

The amount of the separated coolant which flows through the flow rate divider 31 (32) is regulated by the manipulation thereof, which varies the amount of the separated coolant which passes through the heat exchanger 41 (42) for the temperature control. The separated coolant flows merge at the flow merger 43 (44) and the merged flow is introduced into the coolant inlet port 112 (121) of the downstream side divisional passage 12 (13), which differentiates the regions in temperature gradient which are defined by the divisional passages 11, 12 and 13, respectively in such a manner that at the border between two adjacent regions the temperature rise is made in a stepwise fashion. This makes it possible to arbitrarily establish a more flexible stepwise or nonlinear temperature gradient pattern at the cell surface 50 than the temperature pattern illustrated in FIG. 9.

Thus, the arbitrary established temperature gradient pattern makes it possible to restrict excess local drying and/or wetting at each of the fuel electrodes 53 and 54 and the air electrodes 55 and 56, and therefore the internal resistance of the cell and current density at the cell surface 50 may be evenly distributed.

The invention has thus been shown and description with reference to specific embodiments, however it should be understood that the invention is in no way limited to the details of the illustrated structures but changes and modifications may be made without departing from the scope of the appended claims.

In the foregoing structure, for example, though the coolant inlet port and the coolant output port are placed on the common plane as illustrated in FIG. 4, this is not restrictive and therefore the coolant inlet port and the coolant output port may be placed, if necessary, on different planes.

What is claimed is:

1. A solid polymer electrolyte fuel cell having a coolant circulation circuit, the solid polymer electrolyte fuel cell comprising:
   a cell part having a cell surface;
   a coolant flow field plate having a surface positioned opposed to the cell surface;
   an open-faced coolant flow channel formed in a region of the surface of the coolant flow field plate, the open-faced coolant flow channel being divided into a plurality of divisional passages;
   a coolant inlet port provided at one end of each of the divisional passages; and
   a coolant outlet port provided at the other end of each of the divisional passages.

2. A solid polymer electrolyte fuel cell as set forth in claim 1, wherein the coolant outlet port of an upstream one of said divisional passages is adjacent the coolant inlet port of a downstream one of said divisional passages in a direction of coolant flow.

3. A solid polymer electrolyte fuel cell as set forth in claim 2, wherein the divisional passages are connected in series.

4. A solid polymer electrolyte fuel cell as set forth in claim 3, further comprising a heat exchanger interposed in a flow path of the coolant between the coolant outlet port of the upstream one of said divisional passages and the coolant inlet port of the downstream one of said divisional passages.

5. A solid polymer electrolyte fuel cell as set forth in claim 3, further comprising a flow rate regulator interposed in a flow path of the coolant between the coolant outlet port of the upstream one of said divisional passages and the coolant inlet port of the downstream one of said divisional passages.

6. A solid polymer electrolyte fuel cell as set forth in claim 3, further comprising a flow rate regulator and a heat exchanger interposed in a flow path of the coolant between the coolant outlet port of the upstream one of said divisional passages and the coolant inlet port of the downstream one of said divisional passages, wherein the heat exchanger is disposed between the flow rate regulator and the coolant inlet port of the downstream one of said divisional passages.

7. A solid polymer electrolyte fuel cell as set forth in claim 3, further comprising a flow rate regulator and a heat exchanger interposed in a flow path of the coolant between the coolant outlet port of the upstream one of said divisional passages and the coolant inlet port of the downstream one of said divisional passages, wherein the heat exchanger and the flow rate regulator are arranged in parallel.

* * * * *